United States Patent
Ali et al.

(10) Patent No.: US 10,291,639 B1
(45) Date of Patent: May 14, 2019

(54) SYSTEM AND METHOD FOR CREATING CUSTOM SEQUENCE DETECTORS

(71) Applicant: Symantec Corporation, Mountain View, CA (US)

(72) Inventors: Shoukat Ali, San Jose, CA (US); Anand Ganapathy, San Jose, CA (US); Rehan Jalil, Portola Valley, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 371 days.

(21) Appl. No.: 15/374,303

(22) Filed: Dec. 9, 2016

Related U.S. Application Data

(60) Provisional application No. 62/265,335, filed on Dec. 9, 2015.

(51) Int. Cl.
*G06F 11/00* (2006.01)
*H04L 29/06* (2006.01)
*G06F 3/0482* (2013.01)

(52) U.S. Cl.
CPC ........ *H04L 63/1425* (2013.01); *G06F 3/0482* (2013.01)

(58) Field of Classification Search
USPC ............................... 726/22–26; 713/187–189
See application file for complete search history.

(56) References Cited

U.S. PATENT DOCUMENTS

| | | | | |
|---|---|---|---|---|
| 8,175,238 | B2* | 5/2012 | Thai | H04M 3/42306 379/142.02 |
| 10,108,310 | B2* | 10/2018 | Chen | G06F 3/04817 |
| 2005/0021996 | A1* | 1/2005 | Howard | G06F 21/445 726/26 |
| 2010/0067676 | A1* | 3/2010 | Thai | H04M 3/42306 379/142.02 |
| 2015/0040242 | A1* | 2/2015 | Bar-On | G06F 21/6245 726/26 |

\* cited by examiner

*Primary Examiner* — Amare F Tabor
(74) *Attorney, Agent, or Firm* — Maschoff Brennan

(57) ABSTRACT

According to one embodiment, a method comprises presenting a graphical user interface that includes a plurality of user selectable buttons, each button corresponding to a customizable variable of a step in a sequence, and receiving, based on user input, a selection of one of the plurality of user selectable buttons. The method further comprises providing, based on the selection, a plurality of options for the variable corresponding to the selected button, determining a designation of at least one option for one or more variables in a first step and a designation of at least one option for one or more variables in a second step, and generating, based on the determined designations, a custom sequence detector comprising at least the first step and the second step.

15 Claims, 4 Drawing Sheets

US 10,291,639 B1

SYSTEM AND METHOD FOR CREATING CUSTOM SEQUENCE DETECTORS

RELATED APPLICATION

The present application claims priority to provisional U.S. Patent Application No. 62/265,335, filed Dec. 9, 2015, and entitled "Method and Apparatus of Building Custom Detectors for Finding Malicious Behavior."

TECHNICAL FIELD

This disclosure relates in general to sequence detectors and more particularly to a system and method for creating custom sequence detectors.

BACKGROUND

Sensitive information stored to network drive such as a cloud service may be put at risk by the malicious behavior of users of the network. For example, a user may download a confidential document stored to the cloud service and take subsequent actions that jeopardize the security of the downloaded document. Accordingly, detecting malicious behavior of users may maintain the confidentiality of information.

SUMMARY OF THE DISCLOSURE

According to one embodiment, a method comprises presenting a graphical user interface that includes a plurality of user selectable buttons, each button corresponding to a customizable variable of a step in a sequence, and receiving, based on user input, a selection of one of the plurality of user selectable buttons. The method further comprises providing, based on the selection, a plurality of options for the variable corresponding to the selected button, determining a designation of at least one option for one or more variables in a first step and a designation of at least one option for one or more variables in a second step, and generating, based on the determined designations, a custom sequence detector comprising at least the first step and the second step.

Certain embodiments may provide one or more technical advantages. For example, an embodiment of the present disclosure may improve the security of information. As another example, an embodiment of the present disclosure may result in the detections of targeted sequences of past and future user behavior. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Although an isolated instance of a particular user action may not be a cause for concern, a series of particular user actions may be alarming for any number of reasons. As an example, imagine a scenario wherein a rogue employee decides to steal information from his company. The employee plans to share a large number of files with an accomplice outside of the company. The files that the employee wishes to share are accessible through his company's file sharing application which is configured to detect unusually excessive sharing. To avoid being caught, the employee downloads one or two documents, shares them with the accomplice, unshares the documents, and repeats every hour. In just a few days, the employee can covertly exfiltrate dozens of documents using this sequence of actions. Accordingly, it may be beneficial to define sequences of user actions to detect potentially malicious or other unwanted behavior of users.

The teachings of the disclosure recognize creating a custom sequence detector configured to detect a particular sequence of defined user actions. The ability to define and detect particular sequences (also referred to herein as "custom sequences") of user actions may be associated with various technical improvements. For example, a custom sequence detector may improve information security by detecting malicious user behavior that would otherwise be ignored by typical time-series based anomaly detection methods. Other benefits of using a custom sequence detector may also be realized. For example, defining custom sequences may permit targeted detection of user actions. As another example, the ability to define and detect custom sequences of user actions may deter users from participating in unwanted or malicious behavior. As yet another example, a custom sequence detector may detect future occurrences of the custom sequence and/or past occurrences of the custom sequence.

Figure 1:
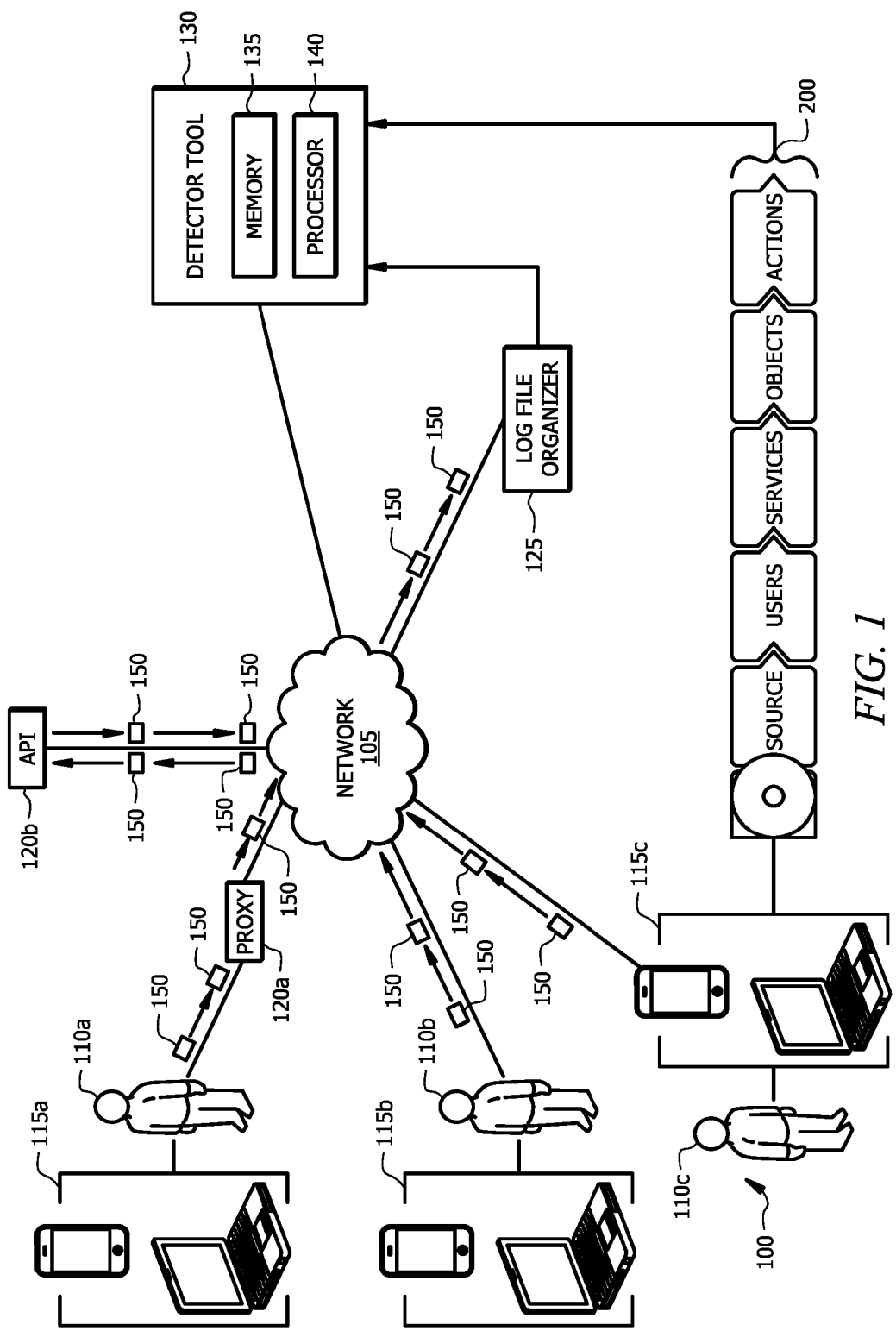
FIG. 1 is a schematic illustrating is an example network environment for a system for creating a custom sequence detector, according to certain embodiments.

FIG. 1 illustrates a network environment for a system for creating a custom sequence detector. In general, the teachings of this disclosure recognize creating a custom sequence detector 200 to detect unwanted user behavior. In some embodiments, user 110 creates a custom sequence detector 200 using device 115. The custom sequence detector 200 may define a sequence of user actions. The custom sequence detector 200 may be configured to be run by a detector tool 130. In response to running custom sequence detector 200, detector tool 130 may identify each occurrence of the defined sequence of user actions from captured transactional data 150. In some embodiments, an occurrence of the defined sequence corresponds to a potentially unwanted user behavior (e.g., malicious user actions).

The network environment 100 may include a network 105, one or more users 110 corresponding to one or more user devices 115, a log file organizer 125, and a detector tool 130. Using device 115, users 110 may communicate with one or more components of network environment 100 over network 105. Actions taken on user device 115 may be recorded by one or more intermediary components such as a data capturing component 120. In some cases, the actions taken on user device 115 may jeopardize the security of information.

Network 105 may refer to any interconnecting system capable of transmitting audio, video, signals, data, messages, or any combination of the preceding. Network 105 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet, or any other suitable communication link, including combinations thereof. One or more portions of one or more of these networks may be wired or wireless. Example wireless networks 100 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

As described above, network environment 100 may include one or more users 110. As depicted in FIG. 1, network environment 100 includes three users 110a-c. Users 110 may send and receive information (collectively, transactional data 150) over network 105 using devices 115. In some embodiments, users 110 are associated with a single entity (e.g., employees of a particular company). In other embodiments, some users 110 are associated with a particular entity and other users 110 are not associated with the particular entity. For example, user 110a may be a rogue employee of Company A who wishes to provide sensitive information about Company A to user 110b, a non-employee of Company A. Further, user 110c may be a system administrator of Company A tasked with detecting unwanted user behavior related to Company A's information. In such an example, user 110c may create a custom sequence detector 200 configured to detect unwanted user actions of user 110a.

Device 115 may be an electronic device including hardware, software, or embedded logic components or a combination of two or more such components and capable of carrying out the appropriate functionalities implemented or supported by device 115. As an example and not by way of limitation, a device 115 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client computer 140.

Device 115 may be communicatively coupled to one or more components of network 105 (e.g., proxy 120a, application programming interface (API) 120b, log file organizer 125, and/or detector tool 130). In some embodiments, device 115 may include a web browser, such as MICROSOFT INTERNET EXPLORER, GOOGLE CHROME, or MOZILLA FIREFOX, and may have one or more add-ons, plug-ins, or other extensions. A user of device 115 may enter a Uniform Resource Locator (URL) or other address directing the web browser to a particular server, and the web browser may generate a Hyper Text Transfer Protocol (HTTP) request and communicate the HTTP request to HTTP server 120. The server may accept the HTTP request and communicate to device 115 one or more files responsive to the HTTP request. The responsive files may include one or more Hyper Text Markup Language (HTML) files, EXtensible Markup Language (XML) files, JavaScript Object Notation (JSON) files, Cascading Style Sheets (CSS) files, pictures, other files, or any other suitable data that is transferable over HTTP. Device 115 may render a webpage based on the responsive files from the server for presentation to a user.

Network environment 100 may also comprise one or more data capturing components 120 configured to capture transactional data 150. As used herein, "transactional data" refers to the exchanges between a user device 115 and the network 105. Transactional data may be recorded and stored in components of network environment 100 and used by system administrators and/or software to ascertain underlying actions taken by a user 110 of a device 115. As an example, network environment 100 may comprise a proxy server 120a and/or an application programming interface (API) 120b) configured to capture transactional data 150. As depicted in FIG. 1, network environment comprises both a proxy server 120a and an API 120b. In this example, transactional data 150 from user device 115a is captured by proxy server 120a and transactional data from user devices 115b-c is captured by API 120b. In some embodiments, the data capturing components 120 send the collected transactional data 150 to other components of network environment 100. For example, the data capturing components 120 may send the collected transactional data 150 to log file organizer 125 and/or detector tool 130. Transactional data 150 may be sent periodically or upon request.

Network environment 100 includes a log file organizer 125 in some embodiments. Log file organizer 125 may be configured to receive transactional data 150 from one or more data capturing components 120 (e.g., proxy server 120a and/or API 120b) and organize the received transactional data 150. In some embodiments, organizing the received transactional data 150 comprises identifying portions of each log file and classifying the portions into one or more categories. For example, log file organizer 125 may, for each log file in transactional data 150, identify a source of the log file entry, a user associated with the log file entry, a service associated with the log file entry, an object associated with the log file entry, and/or an action associated with the log file entry. As will be described in more detail below, a "source" may refer to the data capturing component 120 that collected a particular log file entry, a "user" may refer to the user 110 associated with the device 115 that captured the transactional data 150 associated with the particular log file entry, a "service" may refer to the application or program associated with a particular log file entry, an "object" may refer to an object (e.g., file, folder, spreadsheet) of interaction associated with a particular log file entry, and an "action" may refer to an action (e.g., view, download, upload, share) taken with respect to an object within a particular log file entry. As an example, proxy server 120a may record a log file entry corresponding to user 110a sharing a folder stored to the cloud-based storage drive Box. Log file organizer 125 may receive the log file entry and identify the source of the entry as proxy server 120a, the user of the entry as user 110a, the service of entry as Box, the object of the entry as a folder, and the action of the entry as sharing. In some embodiments, log file organizer 125 sends or otherwise makes the organized information available to a detector tool 130.

Detector tool 130 may be present in the network environment 100 in some embodiments. Detector tool 130 may, in some embodiments, comprise a memory 135 and a processor 140 in some embodiments. Detector tool 130 may be executable software in some embodiments. In other embodiments, detector tool 130 may be or comprise hardware. For example, detector tool 130 may be a computer such as computer 700 of FIG. 7. In yet other embodiments, detector tool 130 may comprise a combination of software and hardware.

Detector tool 130 may be configured to receive organized log file information from log file organizer 125 and run custom sequence detector 200 in some embodiments. Running a custom sequence detector 200 may result in the identification of unwanted user behavior. For example, detector tool 130 may be configured to run a custom sequence detector 200 defining a sequence of user actions captured by either proxy server 120a or API 120b wherein user 110a downloaded and shared ten files in less than ten hours. In response to running such custom sequence detector 200, detector tool 130 may identify, within historical log files, each instance wherein user 110a downloaded and shared ten files in less than ten hours. In some embodiments, detector tool 130 may be forward looking such that detector tool 130 will detect future instances wherein user 110a downloads and shares ten files in less than ten hours. In some embodiments, detecting an instance of the defined sequence corresponds to an indication that one or more users are behaving in an undesirable manner that may jeopardize the security of information.

In operation, one or more users 110 may interact with one or more objects associated with a particular application or software using user device 115. As described above, the actions taken on user device 115 may jeopardize the security of information. User actions may be recorded as transactional data 150 by a data capturing component 120. The log file organizer 125 may receive the transactional data 150 and organize it by identifying one or more of the source, user, service, object and action of each log file entry. The organized information may then be provided to detector tool 130. Detector tool 130 may use the organized information to identify occurrences of sequences defined by custom sequence detectors 200 created by one or more users 115. Detector tool 130 may also use custom sequence detectors 200 to identify future occurrences of the sequences defined by custom sequence detectors 200.

FIGS. 2-6 are schematics illustrating examples of interfaces for creating custom sequence detectors 200. FIG. 7 is a flow chart illustrating a method 700 for creating custom sequence detectors. The method of FIG. 7 may represent an algorithm that is stored on a computer readable medium, such as a memory of a computer. An example of such computer is illustrated in FIG. 8.

Figure 2:
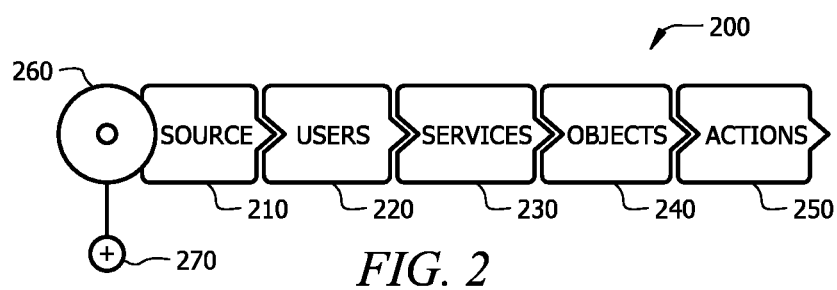
FIGS. 2-5 are examples of interfaces for creating a custom sequence detector using the system of FIG. 1, according to certain embodiments.
Figure 3:
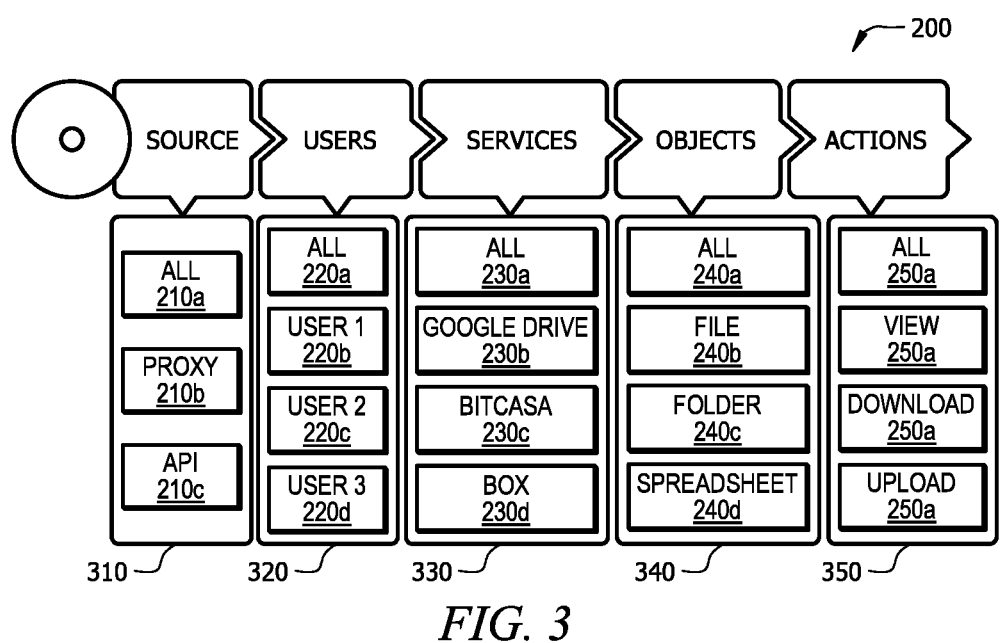
Figure 4:
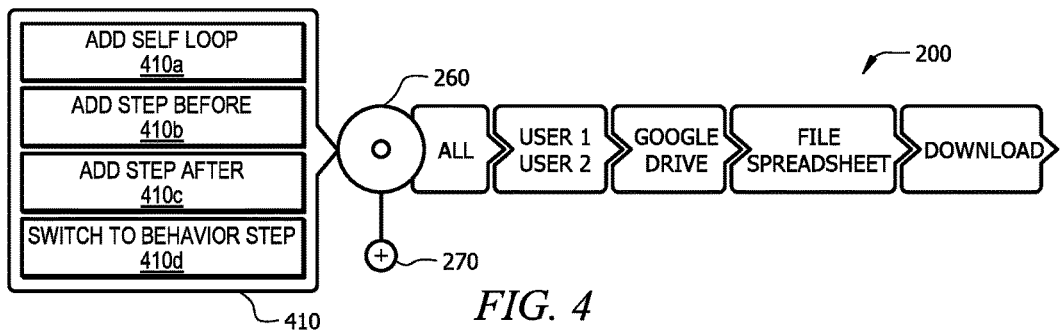
Figure 5:
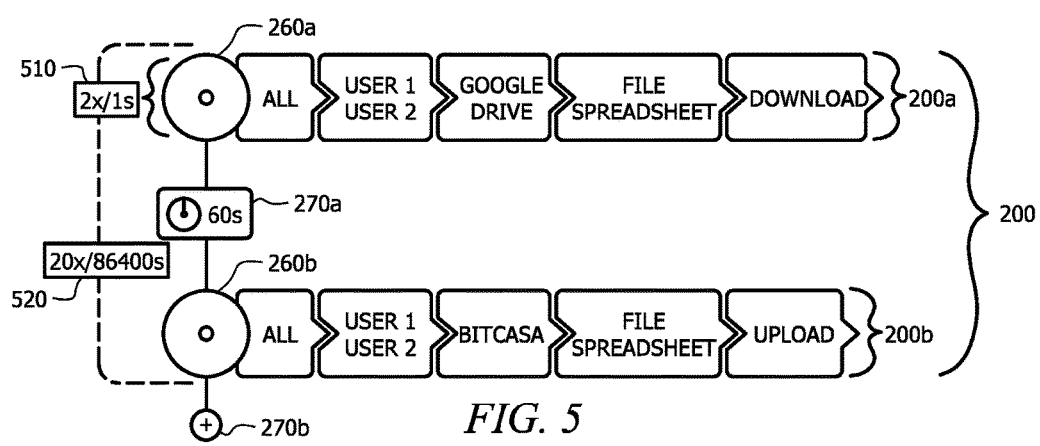

As described above, FIGS. 2-6 illustrate examples of interfaces for creating custom sequence detectors 200. In some embodiments, the interfaces illustrated in FIGS. 2-6 are graphical user interfaces. The interfaces may be presented by a processor operable to execute instructions stored to memory. As an example, the instructions may be stored to memory 135 and executable by processor 140 of FIG. 1. Generally, FIG. 2 illustrates an example of an initial interface presenting a menu of customizable variables for generating a step of custom sequence detector 200. FIG. 3 illustrates examples of drop down lists presenting a plurality of options for each customizable variable and FIG. 4 illustrates an example of an interface wherein the variables have been customized for a single step of custom sequence detector 200. Finally, FIG. 5 illustrates an example of an interface wherein the variables have been customized for more than one step of custom sequence detector 200.

Turning now to FIG. 2, an example of an initial interface is illustrated. In some embodiments, the initial interface presents a menu of customizable variables for generating a step of custom sequence detector 200. The menu may display one or more customizable variables. As depicted in FIG. 2, the menu displays the following variables: sources 210, users 220, services 230, objects 240, and actions 250. Although specific variables have been described and depicted, this disclosure recognizes that the menu may display other customizable variables. As explained above, source 210 may refer to the source of log file data. For example, the source 210 of log file data may be proxy 120a and/or API 120b. Users 220 may refer to one or more users of network 105. For example, users 220 may refer to users 110a-c of network environment 100. Services 230 may refer to an application or program accessed by a user 110. As an example, services 230 may include cloud-based services such as Google Drive or Bitcasa. Objects 240 may refer to objects of interaction within a particular service 230 and actions 250 may refer interactions taken with respect to an object 240. For example, an object 240 may be a file, folder and/or spreadsheet and actions 250 may include view, download, upload, and/or share.

The menu of the initial interface may also include one or more additional nodes. For example, as depicted in FIG. 2, the menu includes a customization node 260 and a duration node 270. These nodes will be explained in more detail below in reference to FIGS. 4 and 5.

Interacting with (e.g., by clicking and/or toggling over) a particular variable (e.g., variables 210-250) may trigger the presentation of a different interface. For example, toggling over "sources" 210 may cause the processor to display an interface presenting a drop down list for "sources" 210. As another example, clicking on "users" 220 may cause processor 140 to display an interface presenting a drop down list for "users" 220. FIG. 3 illustrates an interface displaying drop down lists 310-350 for each customizable variable 210-250. As used herein, a drop down list may comprise user-selectable options related to each customizable variable. For example, as depicted in FIG. 3, drop down list 310 for sources 210 comprises the following options: "all" 210a, "proxy" 210b, and "API" 210c. In some embodiments, a user creating a custom sequence detector 200 selects the "all" option 210a when (s)he is not interested in specifying the source of log file data. In other embodiments, the user may desire to specify the source of log file data and thus may choose either proxy 210b or API 210c. As an example, the user may desire to specify the source of log file data. Although this disclosure recognizes a specific reason for choosing one option over another, this disclosure recognizes that a user may determine to select a particular option for any suitable reason.

FIG. 3 depicts drop down lists for each of the following variables: sources 210, users 220, services 230, objects 240, and actions 250. As explained above, drop down list 310 for sources 210 is depicted as comprising the following options: "all" 210a, "proxy" 210b, and "API" 210c. As depicted, drop down list 320 for users 220 comprises the following options: "all" 320a, "user 1" 320b, "user 2" 320c, and "user 3" 320d, and drop down list 330 for services 230 comprises the following options: "all" 330a, "Google Drive" 330b, "Bitcasa" 330c, and "Box" 230d. Finally, FIG. 3 illustrates a plurality of options within drop down lists 340 and 350 related to objects 240 and actions 250, respectively. For example, as depicted in FIG. 3, drop down list 340 for objects 240 comprises the following options: "all" 240a, "file" 240b, "folder" 240c, and "spreadsheet" 240d, and drop down list 350 for actions 250 comprises the following options: "all" 250a, "view" 250b, "download" 250c, and "upload" 250d.

Although FIG. 3 depicts an interface in which each drop down list for every displayed variable is presented, this disclosure recognizes that drop down lists may be presented upon a user interaction with a variable as explained above. As depicted in FIG. 3, drop down lists 310-350 are presented below each customizable variable. However this disclosure recognizes that drop down lists 310-350 may be presented in any suitable position (e.g., above, to the side of) in the interface. In some embodiments, a user creating custom sequence detector 200 selects one or more options for each variable. For example, as depicted in FIG. 4, user selected "all" 210a for sources 210, "user 1" 220b and "user 2" 220c for users 220, "Google Drive" 230b for services 230, "file" 240b and "spreadsheet" 240d for objects 240, and "download" 250c for actions 250. In some embodiments, running custom sequence detector 200 of FIG. 4 queries the log file data of proxy server 120a and API 120b for entries wherein user 1 (110a) and user 2 (110b) downloaded a file or spreadsheet from Google Drive. In some other embodiments, a user creating custom sequence detector 200 selects one or more options for at least two variables. For example, in creating custom sequence detector 200, a user may select an option defining source 210, users 220, objects 240 and actions 250 but not select an option defining services 230. In some embodiments, the failure to select an option for a variable is perceived by detector tool 130 as a selection of all available options. In other embodiments, the failure to select an option for a variable is perceived by detector tool 130 as an instruction to not include an option for the variable in the query. For example, user may create a custom sequence detector 200 that queries the log file data of proxy server 120a for entries wherein user 1 (110a) shared a folder 240. Detector tool 130 may identify each entry within log file data of proxy server 120a wherein user 1 shared a folder using any service.

This disclosure recognizes that the plurality of options corresponding to each variable may change over time. For example, in response to adding a second proxy server to network environment 100, the second proxy server may be recognized as an option and added to drop down list 310 of FIG. 3. As another example, in response to receiving log file data from a user 4 (not depicted), user 4 may be recognized as an option and added to drop down list 320. Accordingly, this disclosure recognizes that the options presented within drop down lists may change depending on the user of detector tool 130. For example, a first user of detector tool 130 may track log file data related to actions of employees of Company A and a second user of detector tool 130 may track log file data related to actions of employees of Company B. As such, the options within a drop down list (e.g., 310-350) may vary by user of detector tool 130 in that the log file data available to the first user of detector tool 130 will be different from the log file data available to the second user of detector tool 130.

As described above, an interface may include one or more customization nodes 260. In some embodiments, each node may 260 may correspond to a particular step of custom sequence detector 200. For example, as depicted in FIG. 4, custom sequence detector includes one customization node 260 corresponding to the single step of custom sequence detector 200. In contrast, as depicted in FIG. 5, custom sequence detector 200 includes two customization nodes 260a-b corresponding to step one (200a) and step two (200b) of custom sequence detector 200.

Each customization node 260 may be associated with a drop down list comprising user-selectable options with respect to a particular step in custom sequence detector 200. For example, as depicted in FIG. 4, customization node 260 is associated with drop down list 410 comprising the following options: "add self loop" 410a, "add step before" 410b, "add step after" 410c, and "switch to behavioral step" 410d. In some embodiments, the selection of an option presented within drop down list 410 (e.g., 410a-d) causes processor 140 to display a different interface. As used herein, a "self loop" may refer to an instruction to repeat a particular step. In some embodiments, selection of the "add self loop" option 410a permits a user creating custom sequence detector 200 to specify the number of times that a particular step repeats within a given period of time. For example, as depicted in FIG. 5, self loop 510 has been added to step 2 (200a) of custom sequence detector 200. The interface of FIG. 5 also shows that the rate of self loop 510 is defined as two occurrences per second. As such, the self loop of step 1 of custom sequence detector 200 requires the identification of two occurrences of the variables defined in step 1 (200a) wherein the occurrences happened within one second of each other. Taking the example depicted in FIG. 5, running step 200a of custom sequence detector 200 would return an identification of each occurrence wherein either user 1 (110a) or user 2 (110b) downloaded two or more files or spreadsheets using Google Drive in less than one second. In addition to adding a self loop to a step of custom sequence detector 200, a user may also choose to add an additional step to custom sequence detector 200. In some embodiments, the user adds the step before or after the step displayed in FIG. 2. To add a preceding step, a user may select the "add step before" option 410b in drop down list 410 of FIG. 4. To add a subsequent step, a user may select the "add step after" option 410c in drop down list 410 of FIG. 4. In some embodiments, adding a step creates a multi-step custom sequence detector 200. For example, custom sequence detector 200 of FIG. 5 illustrates a two-step custom sequence detector 200 (see step 1 (200a) and step 2 (200b) of custom sequence detector 200 of FIG. 5).

User may also choose to define a time gap between steps. In some embodiments, this is accomplished by selecting duration node 270. Selection of duration node 270 may prompt user to define the time gap between steps 200a and 200b. In some embodiments, the time gap is defined by user input. For example, in one embodiment, interaction with duration node 270b causes processor 140 to display a drop down list presenting a plurality of pre-defined time options (10 seconds, 20 second, 30 seconds) that are selectable by the user. In other embodiments, the time gap is defined by a user defining the time gap (e.g., using a keyboard or other input mechanism). As depicted in FIG. 5, an interface may include one or more duration nodes 270. As suggested by the interface of FIG. 5, step 2 (200b) of custom sequence detector 200 must occur within 60 seconds of step 1 (200a). If the user added an additional step (not depicted) occurring after step 2 (200b), the user could also define the time gap between step 2 and the additional step by interacting with duration node 270b.

A user creating custom sequence detector 200 may also choose to further filter results by defining a number of times that the sequence must occur within a specified period. In some embodiments, user defines such a restriction by interacting with a node on an interface (not depicted). As illustrated in FIG. 5 and identified by the numeral 520, the custom sequence defined by custom sequence detector 200 must occur twenty times within one day (86,400 seconds).

Now that the input of custom sequence detector 200 has been described, it is appropriate to describe the output of custom sequence detector 200. As described above, custom sequence detector 200 is configured to be run by detector tool 130 and may identify sequences of actions defined by a user who created custom sequence detector 200. The custom sequence detector 200 may identify historical occurrences of sequences and/or future occurrences of sequences. As depicted in FIG. 5, the custom sequence detector 200 defines a two-step sequence (see 200a-b), wherein step 2 (200b) must occur within 60 seconds after step 1 (200a) (see duration node 270a) and the defined sequence (steps 1 and 2) must occur twenty times in one day (see numeral 520 of FIG. 5). Further, step 1 must occur two times within one second (see self loop 510). Accordingly, the output of running custom sequence detector 200 of FIG. 5 will identify, within either log file data from proxy server 120a or API 120b, instances wherein the following sequence occurred 20 or more times in one day: users 1 or 2 downloaded at least two files or spreadsheets from Google Drive within one second and, less than 60 seconds later, uploaded a file or spreadsheet to Bitcasa.

Custom sequence detectors 200 may include one or more behavioral steps in some embodiments. As used herein, a behavioral step refers to a learned behavior about a user, wherein such behavior is learned from log file data. As an example and not by way of limitation, a behavioral step may include an identification that a user has taken an action that is inconsistent with his/her past actions. For example, log file data may be collected about user 110a's actions for a period of two years. During the two year period, user 110a never viewed contents of a folder and then shared the viewed folder more than two times in one day, and thus, there is no log file data reflecting such. If user 110a now begins viewing and sharing ten folders within a single day, detector tool 130 may identify such behavior as inconsistent with user 110a's previous actions. Although this disclosure describes particular types of detectable behaviors, detector tool 130 may identify other behaviors associated with a user and the identified behavior may be contemplated in a behavioral step.

As described above in reference to FIG. 4, drop down list 410 may comprise a user selectable option to "switch to behavioral step" 410d. Interaction with option 410 may convert a step of custom sequence detector 200 comprising customizable variables (e.g., variables 210-250 of FIG. 2) into a behavioral step. In this manner, one or more behavioral steps can be added to custom sequence detector 200.

This disclosure also recognizes distinguishing whether an object 240 is sent or shared internally or externally. As used herein, "internal" refers to the sending or sharing of an object with a user 220 having an association to a particular entity (e.g., Company A) that the sender/sharer has an association with. In comparison, "external" refers to the sending or sharing of an object with a user 220 that not does have a shared association with a particular entity (e.g., receiver of shared object does not have an association with Company A but the sharer does have an association with Company A). Being able to distinguish between internal and external users may be beneficial in particular ways. For example, the security of information may not be threatened by the sharing of folders internally but may be threatened by the sharing of folders externally. Thus, identifying occurrences wherein the defined sequences occurred internally may be unnecessary. Accordingly, this disclosure recognizes the ability to further customize sequence detectors to distinguish actions relative to an internal or external status of users 220.

Figure 6:
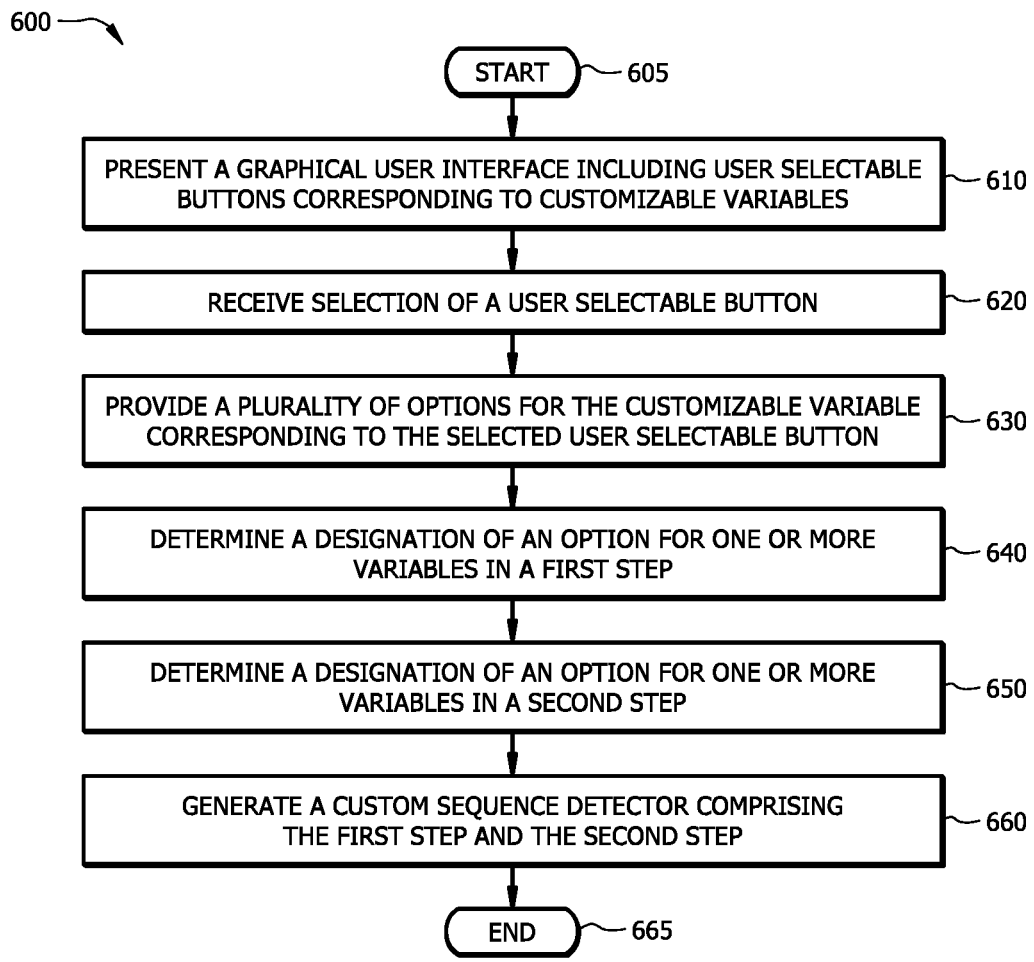
FIG. 6 is a flow chart illustrating an a method of creating a custom sequence detector using the system of FIG. 1, according to certain embodiments.
Figure 7:
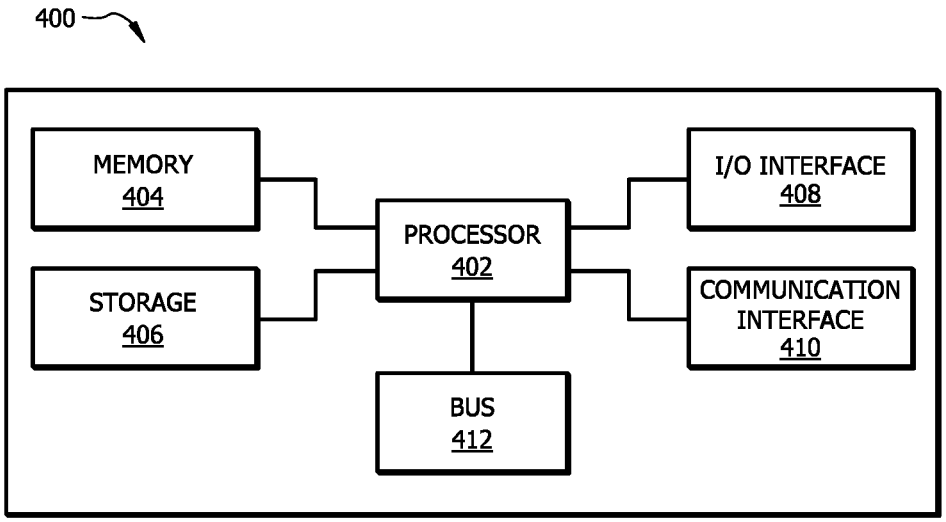
FIG. 7 is a block diagram illustrating an example of a computer system that may execute the custom sequence detector of FIGS. 2-6, according to certain embodiments.

FIG. 6 illustrates a method 600 of creating a custom sequence detector (e.g., custom sequence detector 200 of FIG. 5). As described above, the method 600 may be an algorithm for creating custom sequence detectors that may be executed on a computer such as computer 700 of FIG. 7. In some embodiments, detector tool 130 of FIG. 1 performs the method 600.

The method 600 may begin in a step 605 and continue to a step 610. At step 610, detector tool 130 presents a graphical user interface that includes a plurality of user selectable buttons. In some embodiments, each button corresponds to a customizable variable of a step in a sequence. The customizable variables may comprise one or more of a data source, a user, an application, an object, and an action. As described above, a data source may comprise a source of log file data (e.g., proxy server 120a and API 120b), a user may comprise one or more users associated with a particular entity, an option may comprise an application accessible by at least one user associated with the particular entity, an option may comprise one or more objects in an application that a user can interact with (e.g., files, folders, spreadsheets), and an action may comprise one or more actions that a user can take relative to an object (e.g., view, upload, download, share). In some embodiments, the method proceeds to a step 620 after presenting the graphical user interface.

At step 620, detector tool 130 receives a selection of one of the plurality of user selectable buttons. In some embodiments, the selection is based on user input. As an example and not by way of limitation, detector tool 130 may receive a selection of the user selectable button corresponding to one or more of the data source, the users, the applications, the objects, and the actions. In some embodiments, the method 600 proceeds from step 620 to step 630.

At step 630, detector tool 130 provides, based on the selection at step 620, a plurality of options for the variable corresponding to the selected button. In some embodiments, the plurality of options are presented within a drop down list (e.g., drop down list detector tool 130 may provide a drop down list 310-350). For example, in response to selecting sources 210 of FIG. 2 at step 620, detector tool 130 provides a plurality of options for sources of log file data.

As described above, the plurality of options may be tailored for a user of detector tool 130. Stated differently, the plurality of options capable of being presented are tied to the log file data available to a particular user of detector tool 130. As an example, a first user tracking log file data related to the actions of employees of Company A might have options available that a second user of detector tool 130 does not have (e.g., identifications of users 110 who are employees of Company A). In some embodiments, the method continues to a step 640 after providing the plurality of options.

At step 640, detector tool 130 determines a designation of at least one option for one or more variables in a first step. In some embodiments, the designation is based on user input (e.g., selection of an option by a user). After determining a designation of one or more options, the method 600 may proceed to a step 650.

At step 650, detector tool 130 determines a designation of at least one option for one or more variables in a second step. In some embodiments, the designation is based on user input (e.g., selection of an option by a user). After determining a designation of one or more options, the method 600 may proceed to a step 660.

At step 660, detector tool 130 generates a custom sequence detector 200 comprising at least the first step and the second step. In some embodiments, the custom sequence detector 200 is generated based on the determined designations. For example, the first step and the second step will be defined by the designations determined at step 650. In some embodiments, the method 600 terminates in an end step 665 after a custom sequence detector 200 is generated.

Method 600 may include one or more steps in alternate embodiments. For example, in some embodiments, method 600 may include a run step (not depicted in FIG. 6) wherein detector tool 130 runs the custom sequence detector 200 generated at step 660. In some embodiments, running detector tool 130 enables a user of detector tool 130 to identify occurrences of particular sequences of activities from log file data. The occurrence of the sequence defined by the custom sequence detector 200 may correspond to an identification of unwanted user behavior. In some cases, the unwanted user behavior may jeopardize the security of information.

As described above, the custom sequence detector may include one or more features that may be customized by user of detector tool 130. For example, a user may customize the maximum time duration between the first step and the second step by defining a time indication (see numeral 270a of FIG. 5). As another example, a user may further customize a step by adding one or more self-loops that define a number of times that a step is repeated within a particular period of time (see numeral 510 of FIG. 5). Additionally, a user may also define the number of times that the steps must occur within a period of time (see numeral 520 of FIG. 5). Another customization feature may be adding a behavioral step to custom sequence detector 200 which is configured to identify deviations from typical user behaviors.

Although particular customization features have been described herein, this disclosure recognizes that custom sequence detector 200 may include any other desirable feature.

FIG. 7 illustrates an example computer system 700. As described above, monitoring device 140 may be a computer system such as computer system 700. Computer system 700 may be any suitable computing system in any suitable physical form. As example and not by way of limitation, computer system 700 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

One or more computer systems 700 may perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

Computer system 700 may include a processor 710, memory 720, storage 730, an input/output (I/O) interface 740, a communication interface 750, and a bus 760 in some embodiments, such as depicted in FIG. 6. Although this disclosure describes and illustrates a particular computer system having a particular number of particular components in a particular arrangement, this disclosure contemplates any suitable computer system having any suitable number of any suitable components in any suitable arrangement.

Processor 710 includes hardware for executing instructions, such as those making up a computer program, in particular embodiments. For example, processor 710 may execute Log file correlator 180 to facilitate the annotation of client-server transactions 150. As an example and not by way of limitation, to execute instructions, processor 710 may retrieve (or fetch) the instructions from an internal register, an internal cache, memory 720, or storage 730; decode and execute them; and then write one or more results to an internal register, an internal cache, memory 720, or storage 730. In particular embodiments, processor 710 may include one or more internal caches for data, instructions, or addresses. This disclosure contemplates processor 710 including any suitable number of any suitable internal caches, where appropriate. As an example and not by way of limitation, processor 710 may include one or more instruction caches, one or more data caches, and one or more translation lookaside buffers (TLBs). Instructions in the instruction caches may be copies of instructions in memory 720 or storage 730, and the instruction caches may speed up retrieval of those instructions by processor 710. Data in the data caches may be copies of data in memory 720 or storage 730 for instructions executing at processor 710 to operate on; the results of previous instructions executed at processor 710 for access by subsequent instructions executing at processor 710 or for writing to memory 720 or storage 730; or other suitable data. The data caches may speed up read or write operations by processor 710. The TLBs may speed up virtual-address translation for processor 710. In particular embodiments, processor 710 may include one or more internal registers for data, instructions, or addresses. This disclosure contemplates processor 710 including any suitable number of any suitable internal registers, where appropriate. Where appropriate, processor 710 may include one or more arithmetic logic units (ALUs); be a multi-core processor; or include one or more processors 175. Although this disclosure describes and illustrates a particular processor, this disclosure contemplates any suitable processor.

Memory 720 may include main memory for storing instructions for processor 710 to execute or data for processor 710 to operate on. As an example and not by way of limitation, computer system 700 may load instructions from storage 730 or another source (such as, for example, another computer system 700) to memory 720. Processor 710 may then load the instructions from memory 720 to an internal register or internal cache. To execute the instructions, processor 710 may retrieve the instructions from the internal register or internal cache and decode them. During or after execution of the instructions, processor 710 may write one or more results (which may be intermediate or final results) to the internal register or internal cache. Processor 710 may then write one or more of those results to memory 720. In particular embodiments, processor 710 executes only instructions in one or more internal registers or internal caches or in memory 720 (as opposed to storage 730 or elsewhere) and operates only on data in one or more internal registers or internal caches or in memory 720 (as opposed to storage 730 or elsewhere). One or more memory buses (which may each include an address bus and a data bus) may couple processor 710 to memory 720. Bus 760 may include one or more memory buses, as described below. In particular embodiments, one or more memory management units (MMUs) reside between processor 710 and memory 720 and facilitate accesses to memory 720 requested by processor 710. In particular embodiments, memory 720 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 720 may include one or more memories 180, where appropriate. Although this disclosure describes and illustrates particular memory, this disclosure contemplates any suitable memory.

Storage 730 may include mass storage for data or instructions. As an example and not by way of limitation, storage 730 may include a hard disk drive (HDD), a floppy disk drive, flash memory, an optical disc, a magneto-optical disc, magnetic tape, or a Universal Serial Bus (USB) drive or a combination of two or more of these. Storage 730 may include removable or non-removable (or fixed) media, where appropriate. Storage 730 may be internal or external to computer system 700, where appropriate. In particular embodiments, storage 730 is non-volatile, solid-state memory. In particular embodiments, storage 730 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 730 taking any suitable physical form. Storage 730 may include one or more storage control units facilitating communication between processor 710 and storage 730, where appropriate. Where appropriate, storage 730 may include one or more storages 140. Although this disclosure describes and illustrates particular storage, this disclosure contemplates any suitable storage.

I/O interface 740 may include hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 740 may include one or more device or software drivers enabling processor 710 to drive one or more of these I/O devices. I/O interface 740 may include one or more I/O interfaces 185, where appropriate. Although this disclosure describes and illustrates a particular I/O interface, this disclosure contemplates any suitable I/O interface.

Communication interface 750 may include hardware, software, or both providing one or more interfaces for communication (such as, for example, packet-based communication) between computer system 700 and one or more other computer systems 700 or one or more networks (e.g., network 105). As an example and not by way of limitation, communication interface 750 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 750 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 750 for any of these networks, where appropriate. Communication interface 750 may include one or more communication interfaces 190, where appropriate. Although this disclosure describes and illustrates a particular communication interface, this disclosure contemplates any suitable communication interface.

Bus 760 may include hardware, software, or both coupling components of computer system 700 to each other. As an example and not by way of limitation, bus 760 may include an Accelerated Graphics Port (AGP) or other graphics bus, an Enhanced Industry Standard Architecture (EISA) bus, a front-side bus (FSB), a HYPERTRANSPORT (HT)

interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 760 may include one or more buses 212, where appropriate. Although this disclosure describes and illustrates a particular bus, this disclosure contemplates any suitable bus or interconnect.

The components of computer system 700 may be integrated or separated. In some embodiments, components of computer system 700 may each be housed within a single chassis. The operations of computer system 700 may be performed by more, fewer, or other components. Additionally, operations of computer system 700 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
   a processor;
   a memory configured to store instructions, the instructions when executed by the processor are operable to:
   present a graphical user interface that comprises a plurality of user selectable buttons each corresponding to a customizable variable of a step in a sequence, each customizable variable comprising one or more of a data source, a user, an application, an object, or an action;
   provide, in response to receiving a user selection of one of the plurality of user selectable buttons, a plurality of options for a corresponding customizable variable, wherein:
   the options for the data source comprise one or more sources of log files;
   the options for the user comprise one or more users associated with a particular entity;
   the options for the application comprise one or more applications accessible by at least one user associated with the particular entity;
   the options for the object comprise one or more of files, folders, and spreadsheets; and
   the options for the action comprise one or more actions that a user may take within an application;
   determine, based on user input, a designation of at least one option for one or more customizable variables in a first step and a designation of at least one option for one or more customizable variables in a second step;
   receive, based on user input, a time indication corresponding to the time between the first step and second step; and
   generate, based at least in part on the determined designations, a custom sequence detector comprising the first step, the second step, and the time indication, wherein the custom sequence detector is configured to identify, within log files, instances where the first step and the second step occurred within the time indicated by the time indication.

2. The system of claim 1, wherein the instructions when executed by the processor are further operable to receive, based on user input, a loop indication corresponding to one or more steps, the loop indication defining a number of times that a step is repeated within a specified period of time.

3. The system of claim 1, wherein the custom sequence detector further comprises a behavioral step, the behavioral step comprising an identification of a behavior that deviates from typical behaviors associated with a designated user.

4. The system of claim 1, wherein each identified instance corresponds to a potentially malicious user behavior.

5. A method comprising:
   presenting a graphical user interface that comprises a plurality of user selectable buttons, each button corresponding to a customizable variable of a step in a sequence, each customizable variable comprising one or more of a data source, a user, an application, an object, or an action;
   receiving, based on user input, a selection of one of the plurality of user selectable buttons;
   providing, based on the selection, a plurality of options for the customizable variable corresponding to the selected button, wherein:
   the options for the data source comprise one or more sources of log files;
   the options for the user comprise one or more users associated with a particular entity;

the options for the application comprise one or more applications accessible by at least one user associated with the particular entity;

the options for the object comprise one or more of files, folders, and spreadsheets; and the options for the action comprise one or more actions that a user may take within an application;

determining a designation of at least one option for one or more customizable variables in a first step and a designation of at least one option for one or more customizable variables in a second step;

receiving a time indication corresponding to the time between the first step and second step; and generating, based at least in part on the determined designations, a custom sequence detector comprising the first step, the second step, and the time indication, wherein the custom sequence detector is configured to identify, within log files, instances where the first step and the second step occurred within the time indicated by the time indication.

6. The method of claim 5, wherein the time indication corresponds to a maximum duration between the first step and second step.

7. The method of claim 5, further comprising:
in response to receiving a user selection, adding a self-loop to the custom sequence detector, the self-loop corresponding to one or more steps of the custom sequence detector and defining a number of times that the corresponding step is repeated within a period of time.

8. The method of claim 5, wherein the custom sequence detector further comprises a behavioral step, the behavioral step comprising an identification of a behavior that deviates from typical behaviors associated with a designated user.

9. The method of claim 5, wherein each identified instance corresponds to a potentially malicious user behavior.

10. One or more computer-readable non-transitory storage media in one or more computing systems, the media embodying logic that is operable when executed to:
present a graphical user interface that comprises a plurality of user selectable buttons, each button corresponding to a customizable variable of a step in a sequence, each customizable variable comprising one or more of a data source a user an application, an object, or an action;
receive, based on user input, a selection of one of the plurality of user selectable buttons;

provide, based on the selection, a plurality of options for the customizable variable corresponding to the selected button, wherein:
the options for the data source comprise one or more sources of log files;
the options for the user comprise one or more users associated with a particular entity;
the options for the application comprise one or more applications accessible by at least one user associated with the particular entity;
the options for the object comprise one or more of files, folders, and spreadsheets; and
the options for the action comprise one or more actions that a user may take within an application;

determine a designation of at least one option for one or more customizable variables in a first step and a designation of at least one option for one or more customizable variables in a second step;

receive a time indication corresponding to the time between the first step and second step; and generate, based at least in part on the determined designations, a custom sequence detector comprising the first step, the second step, and the time indication, wherein the custom sequence detector is configured to identify, within log files, instances where the first step and the second step occurred within the time indicated by the time indication.

11. The media of claim 10, wherein the custom sequence detector further comprises a behavioral step, the behavioral step comprising an identification of a behavior that deviates from typical behaviors associated with a designated user.

12. The media of claim 10, wherein each identified instance corresponds to a potentially malicious user behavior.

13. The system of claim 1, wherein the time indication corresponds to a maximum duration between the first step and second step.

14. The media of claim 10, wherein the time indication corresponds to a maximum duration between the first step and second step.

15. The media of claim 10, wherein the logic is further operable when executed to:
in response to receiving a user selection, add a self-loop to the custom sequence detector, the self-loop corresponding to one or more steps of the custom sequence detector and defining a number of times that the corresponding step is repeated within a period of time.

* * * * *